United States Patent [19]

Habecker

[11] 4,230,922

[45] Oct. 28, 1980

[54] SEAL ASSEMBLY FOR SWITCH ACTUATOR

[75] Inventor: John W. Habecker, Zion, Ill.

[73] Assignee: Cherry Electrical Products Corp., Waukegan, Ill.

[21] Appl. No.: 34,255

[22] Filed: Apr. 30, 1979

[51] Int. Cl.³ .......................... H01H 9/04; F16J 15/32

[52] U.S. Cl. .......................... 200/302; 74/18.2; 277/212 FB

[58] Field of Search .......................... 354/64, 266, 288; 74/18, 18.1, 18.2; 200/159 B, 295, 302, 340; 277/30, 12, 4, 138, 165, 212 C, 212 FB

[56] References Cited

U.S. PATENT DOCUMENTS

| | | | |
|---|---|---|---|
| 2,154,651 | 4/1939 | Wodack et al. | 74/18.2 X |
| 2,322,010 | 6/1943 | Fowler | 74/18.2 X |
| 2,814,703 | 11/1957 | Martin | 200/302 |
| 3,011,803 | 12/1961 | Buckner et al. | 277/165 X |
| 3,541,288 | 11/1970 | Maas | 200/302 |
| 3,767,022 | 10/1973 | Olson | 74/18.2 X |

FOREIGN PATENT DOCUMENTS

| | | | |
|---|---|---|---|
| 886759 | 7/1943 | France | 200/302 |
| 334436 | 1/1959 | Switzerland | 200/302 |

*Primary Examiner*—Robert S. Ward, Jr.

[57] ABSTRACT

A boot seal assembly for external movable members such as switch actuators. The assembly includes a cooperating structural support that provides a guide for the movable member as well as a retaining seat for a fixed portion of the boot seal. The movable member provides a retaining means for the remaining collapsible portion of the boot seal without affecting the direction of travel or required operating force for the movable member.

1 Claim, 3 Drawing Figures

SEAL ASSEMBLY FOR SWITCH ACTUATOR

SUMMARY OF THE ART

There have been many attempts to provide a flexible seal between a fixed base member and a movable member. In the electrical field a flexible boot is positioned between the outer switch casing and an external portion of the movable switch actuator. These prior boot seals have been effective to seal the parts; however, they have created problems regarding actuation pressure and travel alignment of the switch actuator.

The present invention overcomes the inherent problems of prior flexible seals by forming the boot seal from a suitable non-conductible flexible material such as Neoprene that possesses a memory characteristic by which it returns to its original shape when released.

The boot seal of this invention is designed to provide a base ring from which a stabilizing collar extends at right angles from the base. From the collar extends a truncated cone terminating into a circular apertured top wall.

Upon depression of the actuator the tapered wall of the cone of the seal will collapse uniformly into the confines of the stabilizing collar having little or no resistance to the axial movement of the actuator nor will the seal tend to create opposing oblique lines of force upon the actuator relative to its axial path of movement. The uniformity in the collapsing tapered wall of the cone creates increased contact pressure at the connections between the boot seal and the switch casing and actuator. Dust, moisture, and foreign particles do not intrude into the interior of the switch casing through the actuator passage.

GENERAL DESCRIPTION

The invention will best be understood by reference to the accompanying drawing, which shows the preferred form of the embodiment of the invention by which the stated objects thereof are achieved, and in which.

The sealing assembly of this invention is hereinafter described as being applicable to a movable switch actuator. It should be noted, however, that this showing and description does not limit the application of the seal to such specific structure.

Figure 1:
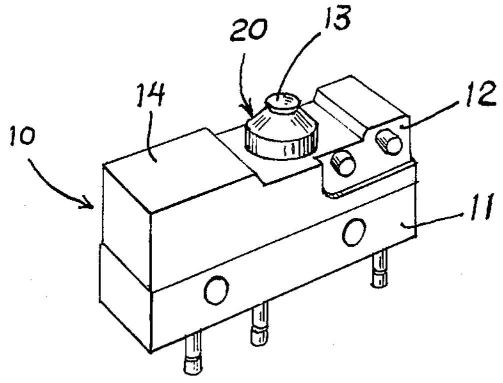
FIG. 1 is a perspective view of a switch having mounted thereon the boot seal of this invention.

In FIG. 1 there is shown an electrical switch 10 having a two part housing consisting of a lower base compartment 11 and an upper compartment 12. A movable actuator 13 projects out of the top wall 14 of the upper casing 12 as shown.

Figure 2:
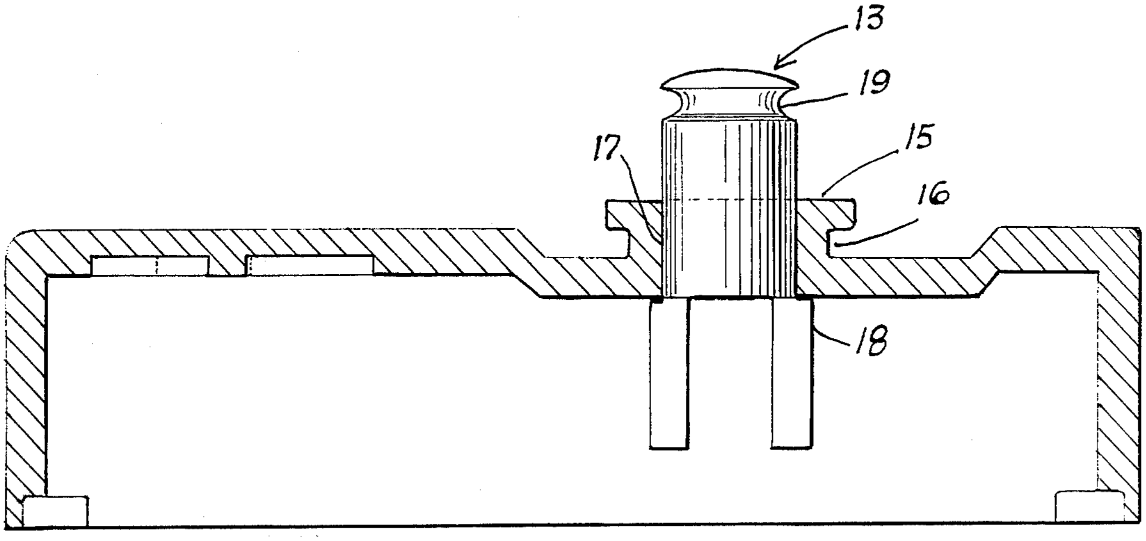
FIG. 2 is a detailed sectional view of the switch casing including a side elevational view of a switch actuator in place.

In FIG. 2 the upper casing 12 is shown as providing a circular bearing 15 which provides a recessed undercut 16. Through the opening 17 formed in the bearing 15 is freely journalled the shank portion 18 of the actuator 13.

The actuator 13 is provided with a recessed concave groove 19 adjacent the external end of the actuator 13, as it appears in FIGS. 1 and 2.

Adapted to seal the opening 17 in the bearing 15 while permitting axial movement of the actuator 13 is a boot seal 20.

Figure 3:
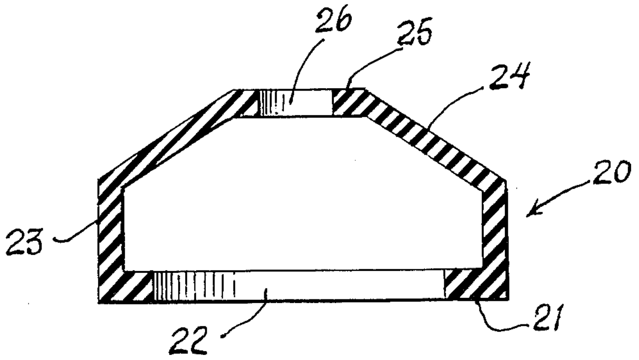
FIG. 3 is a detailed sectional view of the boot seal of this invention.

As shown in FIG. 3, the boot seal is formed from a flexible material such as Neoprene and provides a base ring 21, the opening 22 of which has a diameter equal to the inner circumference of the groove 16 formed in the bearing 15. Extending at right angles to the base ring 21 and to one side thereof is an upstanding collar 23. The collar 23 supports a truncated cone 24, the tapered walls of which terminate into a flat top wall 25. The flat top wall 25 of the boot seal 20 is provided with an aperture 26, the diameter of which corresponds to the circumference of the groove 19 formed in the actuator 13. The aperture 26 of the top wall 25 is in axial alignment with the center opening 22 formed in the base ring 21.

When the switch is assembled as shown in FIG. 1, the boot seal 20 is placed upon the bearing 15 until the base ring 21 thereof snaps into the groove 16. The actuator 13 is held against movement while the flat top 25 of the seal 20 is projected over the top of the actuator 13 so that the walls thereof defining the central opening 26 will snap into the groove 19 formed in the actuator 13.

Upon actuation of the switch 10 the actuator 13 is depressed. This movement will cause a uniform collapsing of the cone walls of the truncated body 24 inwardly of the stabilizing collar 20. As such the collapsing movement of the boot seal 20 will not affect the axial movement of the actuator 13 nor will such operation add sufficiently to the required actuating force necessary to depress the actuator 13.

From the foregoing it is apparent that I have provided a seal assembly for a switch actuator which will prevent dust, moisture, and other foreign particles in the atmosphere from entering into the switch cavity through the actuator opening. I have also provided a boot seal which will not affect the travel of the actuator and one that increases in efficiency during the period of switch actuation. The latter feature is accomplished by having the tapered walls of the truncated cone collapsing uniformly inwardly of the stabilizing collar. This compresses the walls of the top wall 25 which define the opening 26 into tighter sealing contact with the groove 19 formed in the actuator. By the presence of the stabilizing collar 20 the base ring 21 is not deformed so that the central opening 22 thereof is not displaced within the groove 16 formed in the bearing 15 of the switch.

While I have illustrated and described the preferred form of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having thus described my invention what I claim as new and desire to protect by Letters Patent is:

1. The combination of a boot seal and a movable switch actuator of an electrical switch comprising, a switch housing having an opening formed in one wall through which the switch actuator is reciprocally movable, a circular switch actuator movably positioned in said opening and having an end portion positioned externally of said housing and provided with an exposed concave groove, a recessed circular bearing is provided by the one wall of the switch housing and defines the opening through which said switch actuator is movable, a boot seal of resilient material adapted to extend between and be connected to said circular bearing and said switch actuator, said boot seal having a base ring the inner diameter of which is adapted to fit into the recess provided by said bearing so as to attach said boot seal to said switch housing, a cylindrical stabilizing means provided by said boot seal and extending at right angles from said base ring and parallel to said actuator, a truncated cone projecting outwardly of said stabilizing means and providing a center opening the diameter of which is equal to said concave groove formed in the wall of said switch actuator so as to connect the top of said boot seal to said actuator, said cone collapsing uniformly within said stabilizing means as said actuator is moved through the opening formed in said switch housing wall while maintaining the sealing connection of said base ring with said circular bearing and said center opening of said cone with said concave groove formed in said switch actuator.

* * * * *